(12) United States Patent
Aida et al.

(10) Patent No.: US 11,299,029 B2
(45) Date of Patent: Apr. 12, 2022

(54) POWER TRANSMISSION APPARATUS

(71) Applicant: TOYOTA JIDOSHA KABUSHIKI KAISHA, Toyota (JP)

(72) Inventors: Yusuke Aida, Toyota (JP); Hiroaki Kiyokami, Toyota (JP); Kazuki Iwakura, Toyota (JP); Yukinobu Nishikawa, Anjo (JP); Takafumi Sakuda, Toyota (JP); Haruki Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 16/665,182

(22) Filed: Oct. 28, 2019

(65) Prior Publication Data

US 2020/0130496 A1    Apr. 30, 2020

(30) Foreign Application Priority Data

Oct. 29, 2018 (JP) .............................. JP2018-203306
Aug. 22, 2019 (JP) .............................. JP2019-152390

(51) Int. Cl.
*B60K 6/405* (2007.10)
*B62D 21/15* (2006.01)
*B62D 21/17* (2006.01)
*B62D 65/10* (2006.01)

(52) U.S. Cl.
CPC ............. *B60K 6/405* (2013.01); *B62D 21/155* (2013.01); *B62D 21/17* (2013.01); *B62D 65/10* (2013.01)

(58) Field of Classification Search
CPC ........ B60K 6/405; B60K 5/04; B60K 5/1216; B60K 5/12; B62D 21/155; B62D 65/10
See application file for complete search history.

(56) References Cited

U.S. PATENT DOCUMENTS 1,829,676 A * 10/1931 Royce .................. B60K 5/1216
                                                        180/292
3,777,849 A * 12/1973 Piret ..................... F16H 57/0493
                                                        184/6.12
4,147,318 A *  4/1979 McDonald .............. B60K 5/12
                                                        180/54.1

(Continued)

FOREIGN PATENT DOCUMENTS

| JP | 2014-019373 A | 2/2014 |
| KR | 10-2011-0027978 A | 3/2011 |
| WO | 2014/013333 A2 | 1/2014 |

*Primary Examiner* — Frank B Vanaman
(74) *Attorney, Agent, or Firm* — Oliff PLC

(57) ABSTRACT

A power transmission apparatus is used in a vehicle and mounted on a vehicle member via a mount. The power transmission apparatus includes a case. The case includes a motor provided inside the case. The case includes a mount fastening portion for fastening the mount with a plurality of bolts. The mount fastening portion has a plurality of bolt tightening holes. The plurality of bolt tightening holes are provided so that the plurality of bolts are tightened into the plurality of bolt tightening holes. The bolt tightening holes have axial directions parallel to each other. A space isolated from an inside of the case is formed by a wall of the case in a region connecting two adjacent bolt tightening holes when the mount fastening portion is viewed in the axial directions of the plurality of bolt tightening holes.

11 Claims, 7 Drawing Sheets

(56) References Cited

U.S. PATENT DOCUMENTS

| | | | | |
|---|---|---|---|---|
| 4,690,238 A | * | 9/1987 | von Sivers | B60K 5/04 |
| | | | | 180/248 |
| 4,719,815 A | * | 1/1988 | Sherman | B60K 5/04 |
| | | | | 475/206 |
| 5,887,560 A | * | 3/1999 | Kobayashi | F02M 35/10078 |
| | | | | 123/184.21 |
| 6,481,517 B1 | * | 11/2002 | Kobayashi | H02K 7/006 |
| | | | | 180/65.26 |
| 2017/0117570 A1 | | 4/2017 | Ishikawa et al. | |

* cited by examiner

POWER TRANSMISSION APPARATUS

INCORPORATION BY REFERENCE

The disclosure of Japanese Patent Application No. 2019-152390 filed on Aug. 22, 2019 including the specification, drawings and abstract is incorporated herein by reference in its entirety.

BACKGROUND

1. Technical Field

The present disclosure relates to a power transmission apparatus.

2. Description of Related Art

There is known a vehicle power transmission apparatus that is mounted on a vehicle member via a mount and includes a case and a motor provided inside the case. A transaxle of Japanese Unexamined Patent Application Publication No. 2014-019373 corresponds to the vehicle power transmission apparatus. Japanese Unexamined Patent Application Publication No. 2014-019373 discloses a structure in which the case is provided with a mount fastening portion for fastening the mount with a plurality of bolts.

SUMMARY

When the vehicle comes into collision while the vehicle is traveling and the vehicle member is deformed, a load applied outside the case may be applied to the mount due to the deformation of the vehicle member. The load applied to the mount is transmitted to the case via the bolts tightened into the mount fastening portion to crack the case. The crack propagates toward the inside of the case, and a breakage hole communicating the inside and the outside of the case may be generated.

The present disclosure provides a power transmission apparatus in which the generation of a breakage hole communicating the inside and the outside of a case of a power transmission apparatus mounted on a vehicle member via a mount is suppressed even upon a collision of a vehicle.

One aspect of the present disclosure relates to a power transmission apparatus. The power transmission apparatus is used in a vehicle and mounted on a vehicle member via a mount. The power transmission apparatus includes a case. The case includes a motor provided inside the case. The case includes a mount fastening portion for fastening the mount with a plurality of bolts. The mount fastening portion has a plurality of bolt tightening holes. The plurality of bolt tightening holes are provided so that the plurality of bolts are tightened into the plurality of bolt tightening holes. The bolt tightening holes have axial directions parallel to each other. A space isolated from an inside of the case is formed by a wall of the case in a region connecting two adjacent bolt tightening holes when the mount fastening portion is viewed in the axial directions of the plurality of bolt tightening holes.

In the aspect described above, the space may be formed by an auxiliary hole whose axial direction is in common with the axial directions of the plurality of bolt tightening holes. The auxiliary hole may be provided at a position where the auxiliary hole overlaps the region connecting the two bolt tightening holes when the mount fastening portion is viewed in the axial directions of the plurality of bolt tightening holes.

In the aspect described above, a depth of the auxiliary hole may be set to the same dimension as a length of a threaded portion of each of the bolt tightening holes.

In the aspect described above, the auxiliary hole may be provided by casting.

In the aspect described above, the auxiliary hole may be provided at a middle position between the two adjacent bolt tightening holes.

In the aspect described above, the auxiliary hole may be provided so that a center of the auxiliary hole is located in the region connecting the two adjacent bolt tightening holes.

In the aspect described above, the space may be open to an outside of the case when the space is viewed from the outside of the case in a direction perpendicular to the wall of the case.

According to the aspect described above, even if the vehicle comes into collision and a load applied outside the case is transmitted to the case via the bolts tightened into the mount fastening portion, a crack generated in the case can be caused to propagate between the bolt tightening hole and the space. Therefore, the crack can be prevented from propagating toward the inside of the case. Thus, the generation of the breakage hole communicating the inside and the outside of the case can be suppressed even if the case is broken. As a result, it is unlikely that the motor is exposed from the case even if the vehicle comes into collision.

According to the aspect described above, the auxiliary hole is provided at the position where the auxiliary hole overlaps the region connecting the two adjacent bolt tightening holes when the mount fastening portion is viewed in the axial directions of the plurality of bolt tightening holes. Therefore, the crack generated in the case upon the collision of the vehicle can be caused to propagate along the direction in which the bolt tightening holes and the auxiliary hole are arrayed. Thus, the generation of the breakage hole communicating the inside and the outside of the case can be suppressed even if the case is broken.

According to the aspect described above, the depth of the auxiliary hole is set to the same dimension as the length of the threaded portion of each of the bolt tightening holes. Thus, upon the collision of the vehicle, the crack can be generated toward the outside of the case from the distal end of the threaded portion of each of the bolt tightening holes and from the distal end of the auxiliary hole.

According to the aspect described above, the auxiliary hole is provided by casting. Thus, there is no need to further perform machining for providing the auxiliary hole in the molded case. It is possible to suppress formation of an indentation in the inner peripheral surface of the auxiliary hole due to a blowhole when the machining for providing the auxiliary hole is performed, and to suppress the generation of the crack in an unintended direction due to the indentation upon the collision of the vehicle.

According to the aspect described above, the auxiliary hole is provided at the middle position between the two adjacent bolt tightening holes. Thus, it is likely that the crack is generated upon the collision of the vehicle along the direction in which the bolt tightening holes and the auxiliary hole are arrayed. Accordingly, it is likely that the crack can be generated in the intended direction.

According to the aspect described above, the auxiliary hole is provided so that the center of the auxiliary hole is located in the region connecting the two adjacent bolt tightening holes. Thus, it is likely that the crack is generated upon the collision of the vehicle along the direction in which the bolt tightening holes and the auxiliary hole are arrayed. Accordingly, it is likely that the crack can be generated in the intended direction.

According to the aspect described above, the space is open to the outside of the case when the space is viewed from the outside of the case in the direction perpendicular to the wall of the case. Therefore, it is possible to reduce the strength of a portion of the mount fastening portion that is located on the outside of the case. When the case is broken upon the collision of the vehicle, the portion of the mount fastening portion that is located on the outside of the case is broken. Thus, it is possible to suppress the generation of the breakage hole communicating the inside and the outside of the case.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure are described below in detail with reference to the drawings. In the following embodiments, the drawings are simplified or modified, and dimensional ratios, shapes, and the like of respective portions are not necessarily illustrated with accuracy.

Figure 1:
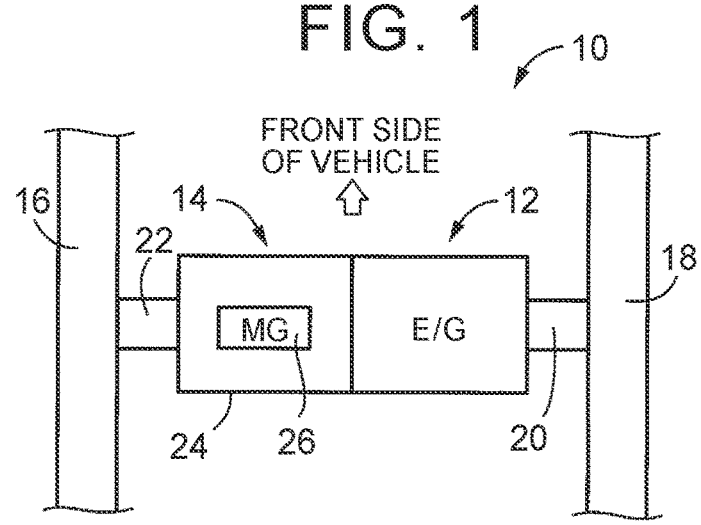
FIG. 1 is a diagram schematically illustrating a structure in which an engine and a power transmission apparatus according to the present disclosure that are provided in a vehicle are suspended on frames.

FIG. 1 schematically illustrates a structure in which an engine 12 and a vehicle power transmission apparatus 14 (hereinafter referred to as a power transmission apparatus 14) provided in a vehicle 10 to which the present disclosure is applied are mounted on frames 16 and 18. In FIG. 1, an upper side of the drawing sheet corresponds to a front side of the vehicle, and a lateral direction of the drawing sheet corresponds to a vehicle width direction.

As illustrated in FIG. 1, the engine 12 and the power transmission apparatus 14 are arranged side by side in the vehicle width direction (lateral direction of the drawing sheet), and are connected together with bolts (not illustrated). The frames 16 and 18 are provided on opposite sides in the vehicle width direction (lateral direction of the drawing sheet). The frames 16 and 18 extend along a longitudinal direction of the vehicle 10. The engine 12 and the power transmission apparatus 14 are arranged between the frame 16 and the frame 18 in the vehicle width direction. The engine 12 is mounted on the frame 18 via a mount bracket 20. The power transmission apparatus 14 is mounted on the frame 16 via a mount bracket 22. The frame 16 corresponds to a vehicle member of the present disclosure. The mount bracket 22 corresponds to a mount of the present disclosure.

The engine 12 is a drive source configured to generate a driving force for traveling of the vehicle. The engine 12 is an internal combustion engine such as a gasoline engine or a diesel engine configured to generate the driving force through combustion of fuel injected into a cylinder. The power transmission apparatus 14 includes a motor 26 inside an axle case 24 that protects internal components. The power transmission apparatus 14 is a hybrid power transmission apparatus configured such that the vehicle travels by power of at least one of the engine 12 and the motor 26. The axle case 24 is formed of a plurality of members including a transmission cover 25 described later, and the plurality of members are integrated by being fastened with bolts.

Figure 2:
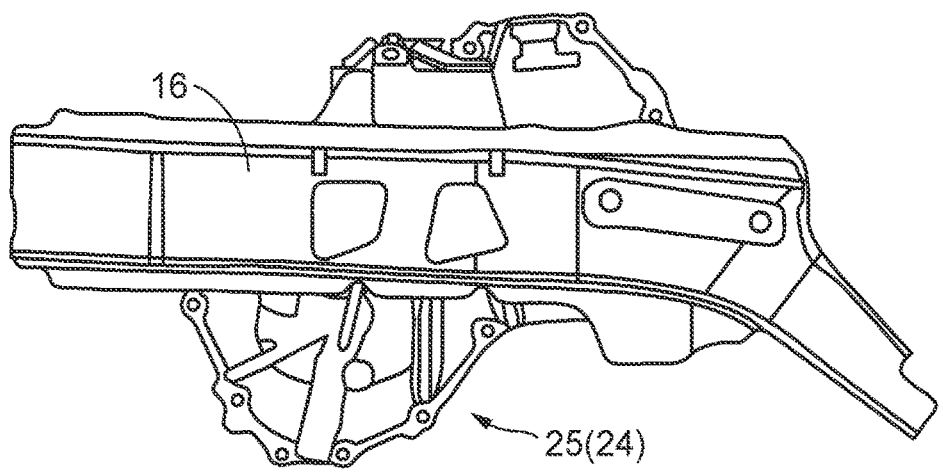
FIG. 2 is a diagram viewed from a left side of the vehicle, illustrating a state in which a transmission cover of the power transmission apparatus of FIG. 1 is coupled to the frame.
Figure 3:
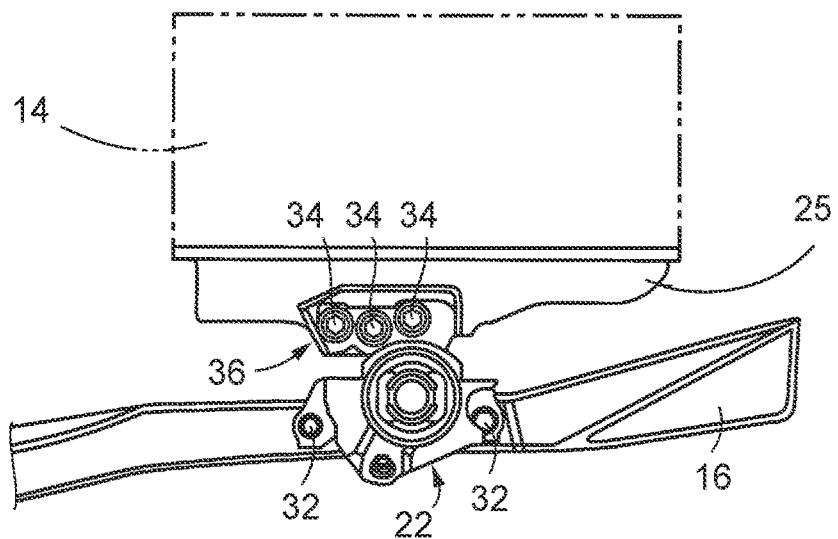
FIG. 3 is a vertical top view of FIG. 2.

FIG. 2 is a diagram viewed from a left side of the vehicle 10, illustrating a state in which the transmission cover 25 (hereinafter referred to as a cover 25) that constitutes the axle case 24 of the power transmission apparatus 14 of FIG. 1 is fixed to the frame 16 via the mount bracket 22. FIG. 3 is a vertical top view of FIG. 2. In FIG. 2, an upper side of the drawing sheet corresponds to an upper side in a vertical direction in an on-board state, and a lateral direction of the drawing sheet corresponds to the longitudinal direction of the vehicle 10 in the on-board state. In FIG. 3, an upper side of the drawing sheet corresponds to a right side in the vehicle width direction, that is, the direction in which the engine 12 and the power transmission apparatus 14 are arranged. The cover 25 is formed into a tray shape, and is provided so as to close a left side of the power transmission apparatus 14 (frame 16 side). The cover 25 corresponds to a case of the present disclosure.

As illustrated in FIG. 2, in the on-board state, the frame 16 passes by the center of the cover 25 in the vertical direction to extend in the longitudinal direction of the vehicle 10. As illustrated in FIG. 3, the tray-shaped cover 25 of the power transmission apparatus 14 is fixed to the frame 16 via the mount bracket 22.

The mount bracket 22 (hereinafter referred to as a mount 22) is interposed between the frame 16 and the cover 25. The mount 22 is fastened to the frame 16 with a plurality of bolts 32, and is fastened to a mount fastening portion 36 described later that is formed on the cover 25 with a plurality of (three in this embodiment) bolts 34.

Figure 4:
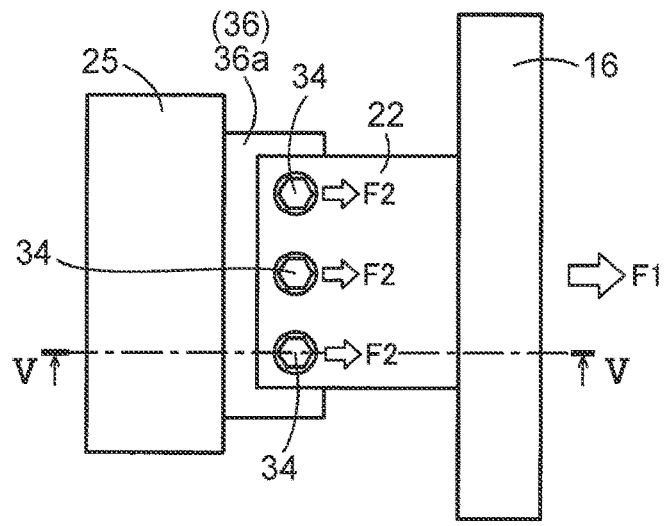
FIG. 4 is a diagram schematically illustrating a fastening structure between the cover and the frame via a mount in FIG. 3.
Figure 5:
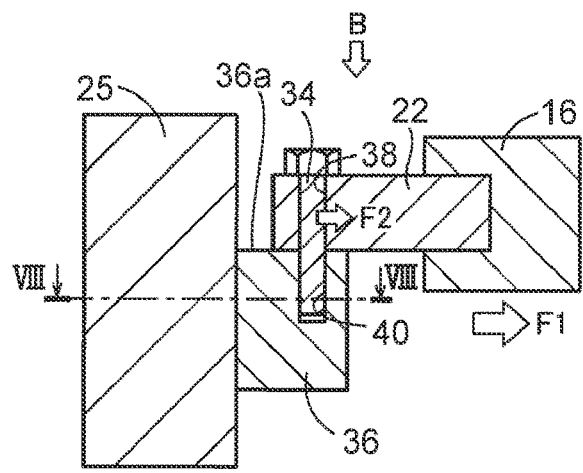
FIG. 5 is a sectional view cut along a cutting plane line A in FIG. 4.

FIG. 4 is a diagram schematically illustrating a fastening structure between the cover 25 and the frame 16 via the mount 22 in FIG. 3. FIG. 5 is a sectional view cut along a cutting plane line A indicated by a long dashed short dashed line in FIG. 4. In FIG. 4 and FIG. 5, a fastening structure between the mount 22 and the frame 16 is omitted.

As illustrated in FIG. 4, the cover 25 is provided with the mount fastening portion 36 for fastening the mount 22 with the three bolts 34. The mount fastening portion 36 is formed so as to protrude from the outer wall surface of the cover 25 toward the frame 16. The mount fastening portion 36 is molded integrally with the cover 25 by casting. The mount fastening portion 36 has a planar fastening surface 36a in a portion where the mount 22 is fastened. The mount 22 is fixed to the mount fastening portion 36 such that the three bolts 34 are tightened in a state in which the mount 22 abuts against the fastening surface 36a. As illustrated in FIG. 5, the mount 22 has bolt holes 38 through which the bolts 34 are inserted, and the mount fastening portion 36 has bolt tightening holes 40 having a threaded portion (internal thread). The bolts 34 are tightened through the bolt holes 38 and the bolt tightening holes 40.

Figure 6:
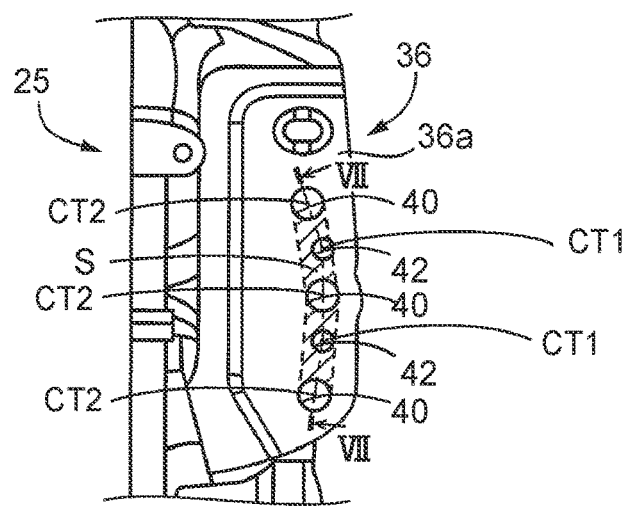
FIG. 6 is a diagram illustrating a mount fastening portion of FIG. 5 that is viewed in a direction indicated by an arrow B, that is, a vertical top view of the mount fastening portion of FIG. 5.

FIG. 6 is a diagram illustrating the mount fastening portion 36 of FIG. 5 that is viewed in a direction indicated by an arrow B, that is, a vertical top view of the mount fastening portion 36 of FIG. 5. As illustrated in FIG. 6, three bolt tightening holes 40 for fastening the three bolts 34 are provided in the fastening surface 36a of the mount fastening portion 36 where the mount 22 is fastened. The bolt tightening holes 40 correspond to the respective bolts 34. Distances between centers CT2 of two adjacent bolt tightening holes 40 are equal or approximate dimensions. The bolt tightening holes 40 are provided perpendicular to the fastening surface 36a of the mount fastening portion 36. Thus, axial directions of the bolt tightening holes 40 are parallel to each other.

Auxiliary holes 42 having circular cross sections are each provided between two adjacent bolt tightening holes 40. The auxiliary hole 42 may be any hole. The sectional shape of the auxiliary hole 42 need not essentially be the circular shape. Each auxiliary hole 42 is provided at a middle position between the two adjacent bolt tightening holes 40 or at a position in the vicinity of the middle position (position where the distances between the auxiliary hole 42 and one of the adjacent bolt tightening holes 40 and between the auxiliary hole 42 and the other one of the adjacent bolt tightening holes 40 are equal). The auxiliary holes 42 are provided perpendicular to the fastening surface 36a of the mount fastening portion 36. The auxiliary holes 42 are provided by casting similarly to the cover 25. That is, a die (casting mold) for molding the cover 25 is provided in advance with columnar protrusions for forming the auxiliary holes 42, and the auxiliary holes 42 having the same sizes as those of the protrusions are formed after the casting. By providing the auxiliary holes 42 by casting, there is no need to perform cutting work (drilling) for forming the auxiliary holes 42. If the auxiliary holes 42 are provided by cutting work and if a blowhole is generated at a portion to be subjected to machining for providing the auxiliary holes 42, an indentation may be formed due to the blowhole in the inner peripheral surface (surface) of any auxiliary hole 42 formed after the machining. If the auxiliary holes 42 are formed by casting, the formation of the indentation is suppressed.

When the fastening surface 36a of the mount fastening portion 36 is viewed in the axial direction of the bolt tightening hole 40, that is, viewed in a direction perpendicular to the fastening surface 36a of the mount fastening portion 36, each auxiliary hole 42 is provided so as to overlap each hatched region S connecting the two adjacent bolt tightening holes 40. Specifically, each auxiliary hole 42 is provided so that a center CT1 of the auxiliary hole 42 is located in each region S formed between two dashed lines illustrated in FIG. 6. By forming the auxiliary hole 42 in the region S connecting the two bolt tightening holes 40 when the mount fastening portion 36 is viewed in the axial direction of the bolt tightening hole 40, a space isolated from the inside of the cover 25 is formed in the region S by a wall of the cover 25. One of the two dashed lines illustrated in FIG. 6 is a line tangent to the outer peripheries of the two bolt tightening holes 40 on an outer side of the cover 25 (side spaced away from the inside of the cover 25) with respect to a line passing through the centers CT2 of the two adjacent bolt tightening holes 40. The other dashed line is a line tangent to the outer peripheries of the two bolt tightening holes 40 on an inner side of the cover 25 (side located closer to the inside of the cover 25) with respect to the line passing through the centers CT2 of the two adjacent bolt tightening holes 40. In this embodiment, each auxiliary hole 42 is provided so as to overlap each region S entirely.

Figure 7:
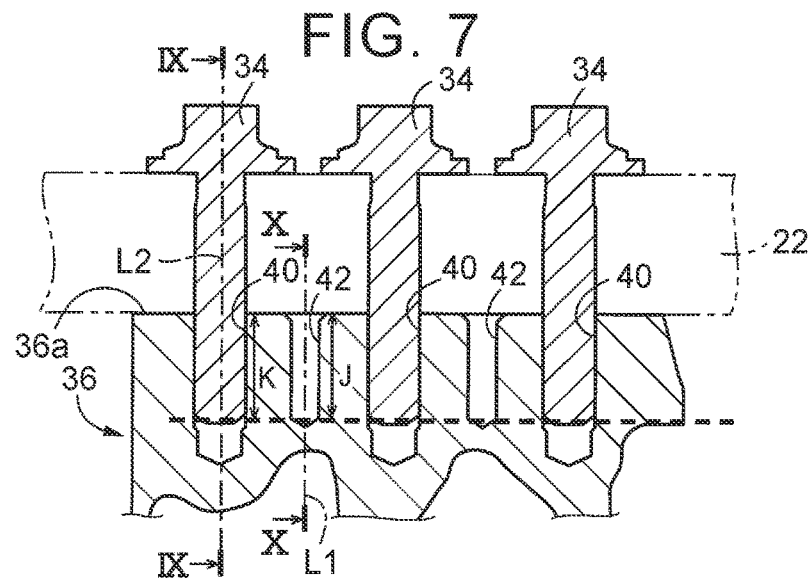
FIG. 7 is a sectional view cut along a cutting plane line C in FIG. 6 in a state in which bolts are tightened.

FIG. 7 is a sectional view cut along a cutting plane line C indicated by a long dashed short dashed line in FIG. 6 in a state in which the bolts 34 are tightened into the bolt tightening holes 40, respectively. The cutting plane line C in FIG. 6 is a line connecting the centers CT2 of the bolt tightening holes 40 and the centers CT1 of the auxiliary holes 42.

As illustrated in FIG. 7, each auxiliary hole 42 is provided in the same direction as the axial direction of the bolt tightening hole 40. Specifically, each auxiliary hole 42 is provided so that a line L1 passing through its center CT1 is parallel to a line L2 passing through the center CT2 of the bolt tightening hole 40. A depth J of the auxiliary hole 42 is set to the same dimension as a length K of the threaded portion (internal thread) of each bolt tightening hole 40.

In the mount fastening portion 36 constructed as described above, when the vehicle comes into collision while the vehicle is traveling and a load F1 is applied to the frame 16 in a direction indicated by an arrow in FIG. 4 and FIG. 5, the load F1 is distributed and transmitted to the bolts 34 via the mount 22. Further, loads are applied to the cover 25 in a direction perpendicular to the wall surface due to loads F2 applied to the bolts 34. If a breakage hole communicating the inside and the outside of the cover 25 is generated due to the collision of the vehicle 10, a high-voltage portion such as the motor 26 provided inside the cover 25 (inside the axle case 24) may be touched through the breakage hole. Therefore, the safety may decrease. In order to suppress the generation of the breakage hole in the cover 25 upon the collision, it is conceivable, for example, to increase the strength of the cover 25 or arrange a member that closes the breakage hole inside the cover 25. However, those measures cause an increase in the mass or in manufacturing costs.

In this embodiment, the auxiliary holes 42 described above are formed in the mount fastening portion 36, thereby suppressing the generation of the breakage hole communicating the inside and the outside of the cover 25 upon the collision of the vehicle. Actions and effects attained by forming the auxiliary holes 42 in the mount fastening portion 36 are described below.

Figure 8:
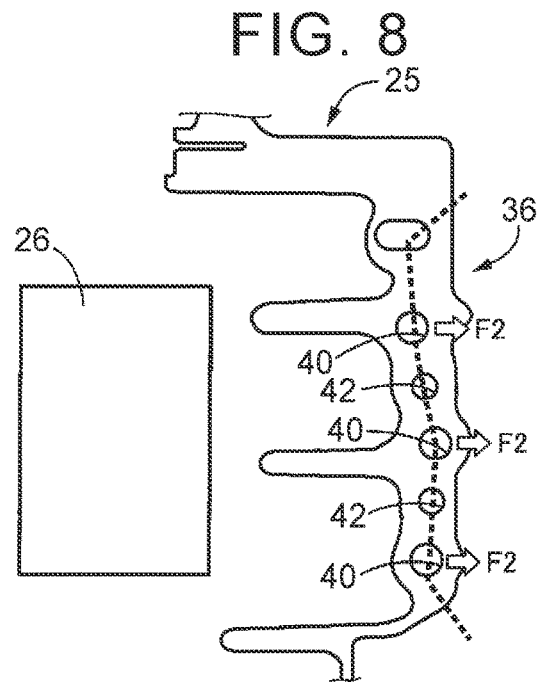
FIG. 8 is a sectional view cut along a cutting plane line G in FIG. 5.
Figure 9:
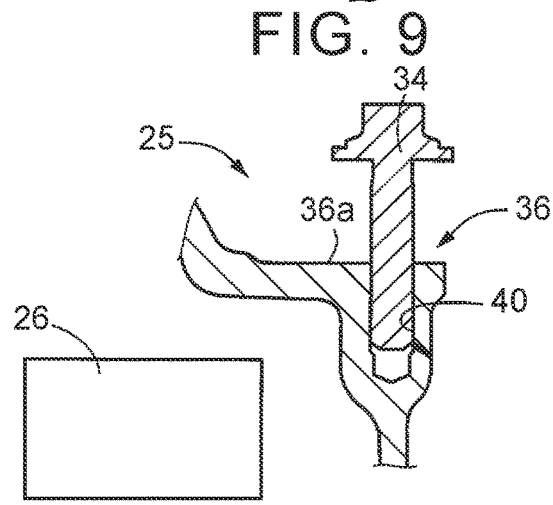
FIG. 9 is a sectional view cut along a cutting plane line D in FIG. 7.
Figure 10:
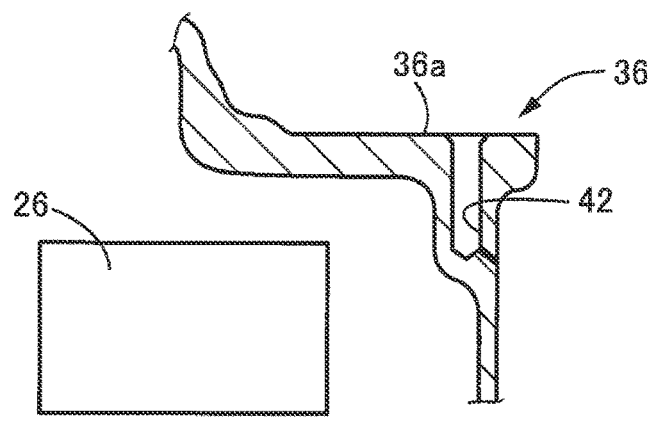
FIG. 10 is a sectional view cut along a cutting plane line E in FIG. 7.

FIG. 8 is a sectional view cut along a cutting plane line G indicated by a long dashed short dashed line in FIG. 5. FIG. 9 is a sectional view cut along a cutting plane line D indicated by a long dashed short dashed line in FIG. 7. FIG. 10 is a sectional view cut along a cutting plane line E indicated by a long dashed short dashed line in FIG. 7.

As illustrated in FIG. 8, when the loads F2 are transmitted to the bolts 34 upon the collision of the vehicle, the loads F2 are also applied in a direction perpendicular to the cover 25 to a portion of the cover 25 where the bolt tightening holes 40 are provided. Since the auxiliary holes 42 are each provided between the two adjacent bolt tightening holes 40, a stress concentrates upon the collision of the vehicle on portions connecting the bolt tightening holes 40 and the auxiliary holes 42 adjacent to each other. Thus, a crack is generated in the cover 25 upon the collision of the vehicle and extends in a direction in which the bolt tightening holes 40 and the auxiliary holes 42 adjacent to each other are arrayed as indicated by a dashed line in FIG. 8. In particular, it is likely that the crack is generated along the direction in which the bolt tightening holes 40 and the auxiliary holes 42 are arrayed by providing each auxiliary hole 42 at the middle position between the two adjacent bolt tightening holes 40 or at the position in the vicinity of the middle position and by providing each auxiliary hole 42 so that the center CT1 of the auxiliary hole 42 is located in the region S connecting the two adjacent bolt tightening holes 40. Since the crack propagates as indicated by the dashed line in FIG. 8, the crack does not propagate toward the inside of the cover 25. Thus, the generation of the breakage hole communicating the inside and the outside of the cover 25 is suppressed even if the cover 25 is broken.

Figure 16:
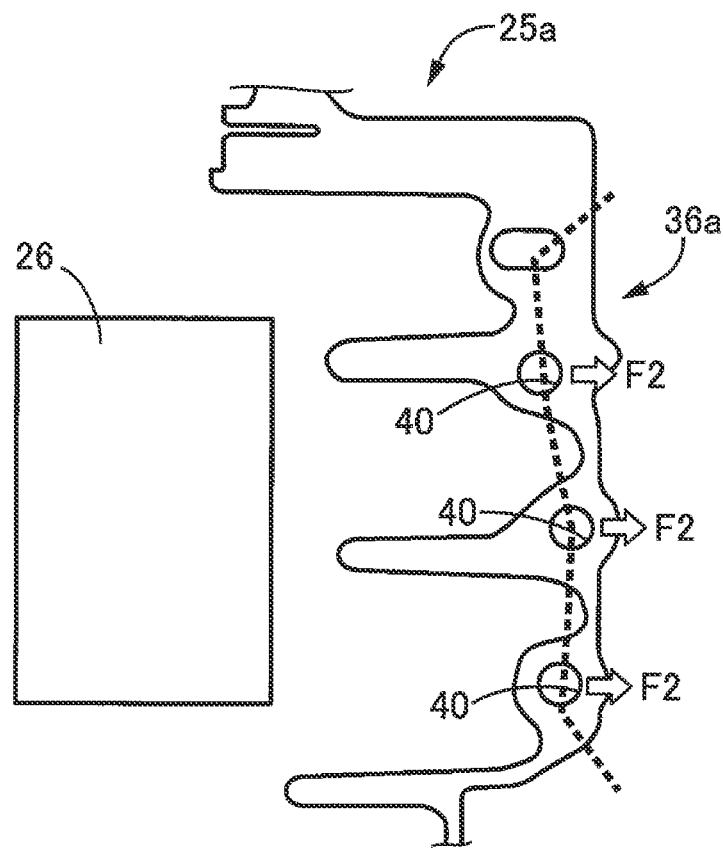
FIG. 16 is a diagram illustrating a crack generated upon a collision of a vehicle in a structure of related art.

FIG. 16 illustrates a crack generated upon the collision of the vehicle in a cover 25a having a structure of related art for comparison. In the cover 25a having the structure of related art, the crack is generated as indicated by a dashed line when the loads F2 are transmitted upon the collision of the vehicle. At this time, the internal space of the cover 25a partially overlaps the dashed line, and therefore breakage holes are generated in the cover 25a when the cover 25a is broken. In the cover 25 of this embodiment, the crack propagates along the direction in which the bolt tightening holes 40 and the auxiliary holes 42 are arrayed as indicated by the dashed line in FIG. 8 upon the collision of the vehicle because the cover 25 is thickened so that the auxiliary holes 42 are each formed between the two adjacent bolt tightening holes 40. Thus, the generation of the breakage hole communicating the inside and the outside of the cover 25 is suppressed even if the cover 25 is broken.

Upon the collision of the vehicle, the crack is generated along a direction indicated by a wide continuous line in the sectional views of FIG. 9 and FIG. 10. Specifically, the crack is generated from the distal end of the threaded portion of the bolt tightening hole 40 toward the outside of the cover 25 as illustrated in FIG. 9, and from the distal end of the auxiliary hole 42 toward the outside of the cover 25 as illustrated in FIG. 10. The crack is also generated toward the outside of the cover 25 at the portion connecting the distal end of the threaded portion of the bolt tightening hole 40 and the distal end of the auxiliary hole 42. As described above, the length K of the threaded portion of the bolt tightening hole 40 and the depth J of the auxiliary hole 42 are the same dimensions in their axial directions. Therefore, when the load F2 is applied in the vicinity of each bolt tightening hole 40 of the cover 25 upon the collision of the vehicle, the stress concentrates on the distal end of the threaded portion of the bolt tightening hole 40, the distal end of the auxiliary hole 42, and the portion connecting the distal ends. Thus, upon the collision of the vehicle, the crack is generated toward the outer wall of the cover 25 from the portion connecting the distal end of the threaded portion of the bolt tightening hole 40 and the distal end of the auxiliary hole 42. As a result, the crack is not generated toward the inside of the cover 25. Accordingly, the generation of the breakage hole communicating the inside and the outside of the cover 25 is suppressed even if the cover 25 is broken.

As described above, the crack is generated in the cover 25 as illustrated in FIG. 8 to FIG. 10 upon the collision of the vehicle. Therefore, the cover 25 is broken along the crack upon the collision of the vehicle 10. Since the cover 25 is broken as indicated by the dashed line in FIG. 8 to FIG. 10, the wall that isolates the inside and the outside of the cover 25 is maintained even after the breakage of the cover 25, thereby suppressing the generation of the breakage hole communicating the inside and the outside of the cover 25. Thus, the safety is improved because of a decrease in the possibility that the motor 26 provided inside the cover 25 is touched by a hand. In this embodiment, there is no need to increase the strength of the cover 25 in order to suppress the generation of the breakage hole in the cover 25 or to add the member for suppressing the generation of the breakage hole because the auxiliary holes 42 are only provided in the structure of related art. Thus, there is no such problem that the weight of the cover 25 increases by increasing the strength of the cover 25 or the manufacturing costs increase by adding the member for suppressing the generation of the breakage hole.

As described above, according to this embodiment, even if the vehicle 10 comes into collision and the loads F2 are transmitted to the cover 25 via the bolts 34 tightened into the mount fastening portion 36, the crack generated in the cover 25 can be caused to propagate along the direction in which the bolt tightening holes 40 and the auxiliary holes 42 are arrayed. As a result, the cover 25 is broken along the crack, and therefore the generation of the breakage hole communicating the inside and the outside of the cover 25 can be suppressed. In reference to this, it is unlikely that the motor 26 is exposed to the outside even if the cover 25 is broken. Thus, the decrease in the safety can be suppressed.

According to this embodiment, the depth J of the auxiliary hole 42 is set to the same dimension as the length K of the threaded portion of the bolt tightening hole 40. Therefore, upon the collision of the vehicle, the crack can be generated toward the outside of the cover 25 from the portion connecting the distal end of the threaded portion of the bolt tightening hole 40 and the distal end of the auxiliary hole 42. Since the auxiliary holes 42 are provided by casting, there is no need to further perform machining for providing the auxiliary holes 42 in the molded cover 25. It is possible to suppress the formation of the indentation in the inner peripheral surface of the auxiliary hole 42 due to the blowhole when the machining for providing the auxiliary holes 42 is performed, and to suppress the generation of the crack in an unintended direction due to the indentation upon the collision of the vehicle.

Next, other embodiments of the present disclosure are described. In the following description, parts in common with those of the embodiment described above are represented by the same reference symbols to omit their description.

Figure 11:
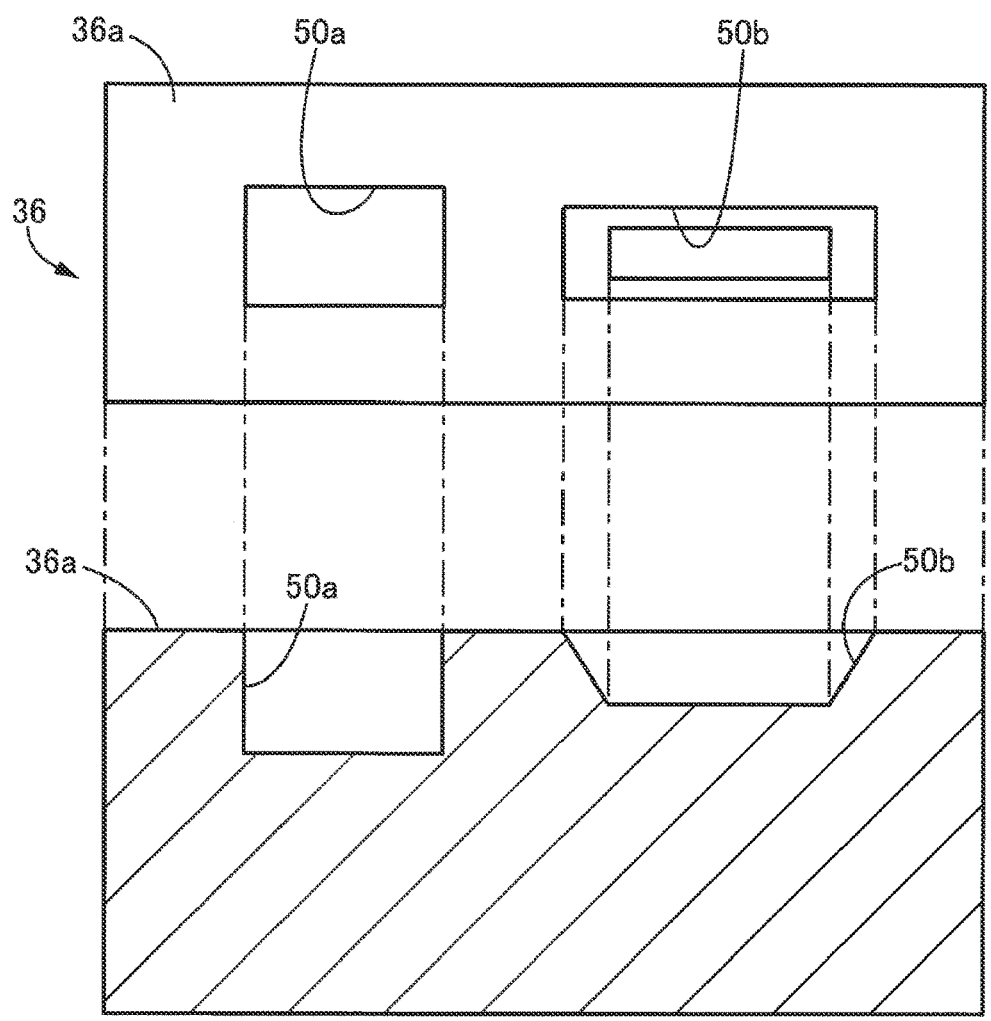
FIG. 11 is a diagram illustrating shapes of auxiliary holes according to another embodiment of the present disclosure.

FIG. 11 illustrates shapes of auxiliary holes 50a and 50b according to another embodiment of the present disclosure. An upper part of FIG. 11 corresponds to a vertical top view of the mount fastening portion 36. A lower part of FIG. 11 corresponds to a sectional view of a portion of the mount fastening portion 36 where the auxiliary holes 50a and 50b are provided.

In the embodiment described above, the auxiliary hole 42 is a circular hole having a circular cross section, but the sectional shape of the auxiliary hole is not limited to the circular shape. For example, a rectangular cross section may be employed as in the case of the auxiliary hole 50a of FIG. 11. As in the case of the auxiliary hole 50b of FIG. 11, the wall surfaces that define the auxiliary hole may be inclined with respect to the direction in which the auxiliary hole extends. The auxiliary holes 50a and 50b of FIG. 11 are examples, and the sectional shape of the auxiliary hole may be changed to, for example, an oval shape or a trapezoidal shape as well as the circular shape and the rectangular shape. Even in the case of the circular hole having the circular cross section, the wall surface that defines the auxiliary hole may be inclined so that the sectional area decreases as the depth of the auxiliary hole increases. In this manner, the sectional shape of the auxiliary hole may be changed.

Figure 12:
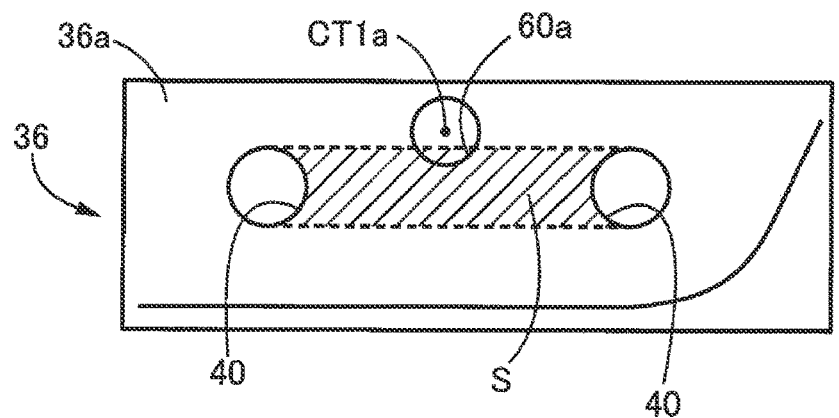
FIG. 12 is a diagram illustrating a shape of an auxiliary hole according to still another embodiment of the present disclosure.
Figure 13:
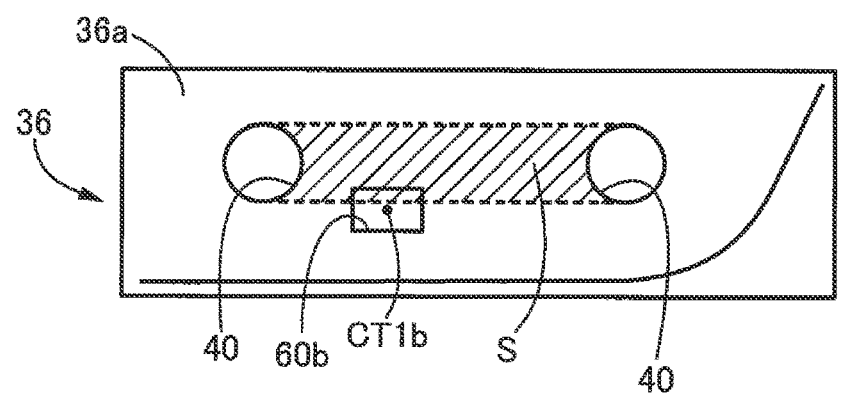
FIG. 13 is a diagram illustrating a shape of an auxiliary hole according to still another embodiment of the present disclosure.
Figure 14:
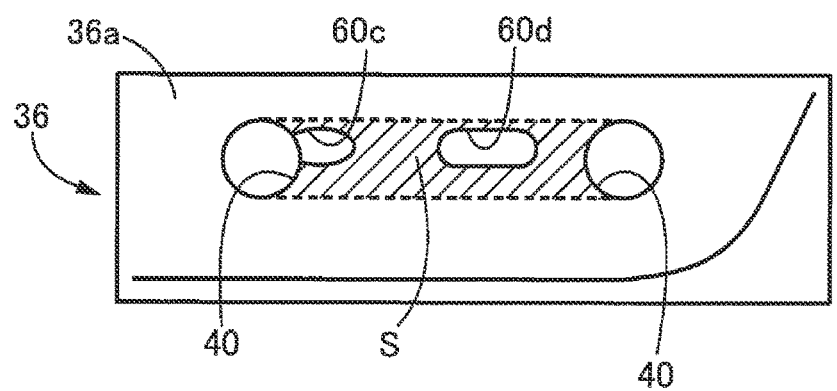
FIG. 14 is a diagram illustrating shapes of auxiliary holes according to still another embodiment of the present disclosure.

FIG. 12 to FIG. 14 illustrate auxiliary holes 60a to 60d each provided between the bolt tightening holes 40 according to still other embodiments of the present disclosure. FIG. 12 to FIG. 14 are vertical top views of the mount fastening portion 36. As illustrated in FIG. 12, the auxiliary hole 60a provided between the two adjacent bolt tightening holes 40 partially overlaps the region S connecting the two bolt tightening holes 40 though a center CT1a of the auxiliary hole 60a is located outside the region S. In the case of this structure as well, the crack can be generated upon the collision of the vehicle in a direction in which the bolt tightening holes 40 and the auxiliary hole 60a are arrayed. Thus, the cover 25 is broken along the crack upon the collision of the vehicle, thereby suppressing the generation of the breakage hole communicating the inside and the outside of the cover 25. In this embodiment as well, effects similar to those of the embodiments described above are attained.

Even if the sectional shape of the auxiliary hole is a shape other than the circular shape, the auxiliary hole only needs to partially overlap the region S connecting the two adjacent bolt tightening holes 40. For example, the auxiliary hole 60b illustrated in FIG. 13 partially overlaps the region S connecting the two adjacent bolt tightening holes 40 though the auxiliary hole is formed into a rectangular sectional shape and a center CT1b of the auxiliary hole 60b is located outside the region S. If the auxiliary hole partially overlaps the region S in this manner, the sectional shape is not limited to the circular shape, and effects similar to those of the embodiments described above are attained.

As illustrated in FIG. 14, a plurality of auxiliary holes 60c and 60d may be provided between the two adjacent bolt tightening holes 40. In FIG. 14, two auxiliary holes 60c and 60d are provided between the two adjacent bolt tightening holes 40. Each of the auxiliary holes 60c and 60d has an oval sectional shape. The auxiliary hole 60c is connected to the bolt tightening hole 40. In this manner, the plurality of auxiliary holes 60c and 60d may be provided between the bolt tightening holes 40, and the auxiliary hole 60c may be connected to the bolt tightening hole 40. In the case of this structure as well, effects similar to those of the embodiments described above are attained.

Figure 15:
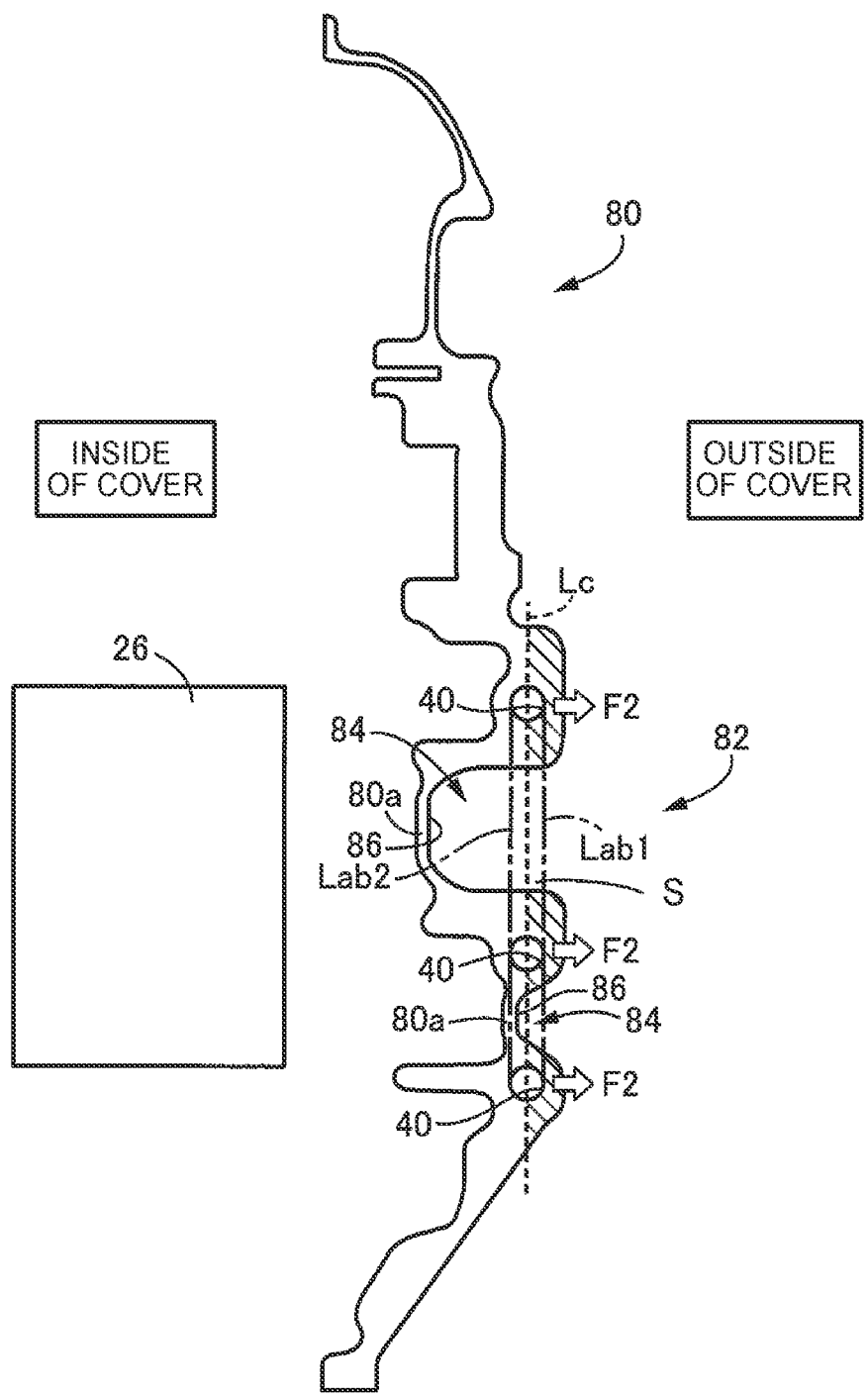
FIG. 15 is a sectional view of a transmission cover according to still another embodiment of the present disclosure.

In this embodiment, spaces 84 described later are formed in place of the auxiliary holes (42, 50a, 50b, 60a to 60c) formed in the mount fastening portion 36 in the embodiments described above. FIG. 15 is a sectional view of a transmission cover 80 (hereinafter referred to as a cover 80) according to still another embodiment of the present disclosure. FIG. 15 corresponds to FIG. 8 of the first embodiment described above. That is, FIG. 15 corresponds to a sectional view of the cover 80 cut along the cutting plane line G indicated by the long dashed short dashed line in the state illustrated in FIG. 5 of the first embodiment described above. The cover 80 constitutes the case of the power transmission apparatus, and houses the motor 26 and the like. The cover 80 corresponds to the case of the present disclosure.

As illustrated in FIG. 15, the cover 80 is provided with a mount fastening portion 82 for fastening the mount bracket 22 (see FIG. 5 or the like) with a plurality of bolts (not illustrated in this embodiment). The mount fastening portion 82 is provided with a plurality of (three in this embodiment) bolt tightening holes 40 where the bolts are tightened, respectively. The bolt tightening holes 40 are provided so that the directions in which the bolt tightening holes 40 extend are parallel to each other.

When the mount fastening portion 82 is viewed in the axial directions of the plurality of bolt tightening holes 40, each space 84 isolated from the inside of the cover 80 is formed by a wall 80a of the cover 80 in each region S connecting the two adjacent bolt tightening holes 40. That is, when each space 84 is viewed in the axial direction of the bolt tightening hole 40, at least a part of each space 84 is provided at a position where the space 84 overlaps each region S connecting the two adjacent bolt tightening holes 40. In FIG. 15, each region S corresponds to a region located between two lines Lab1 and Lab2 indicated by long dashed short dashed lines tangent to the outer peripheries of the bolt tightening holes 40. The line Lab1 is a line tangent to the outer peripheries of the bolt tightening holes 40 that are located on a side spaced away from the inside of the cover 80. The line Lab2 is a line tangent to the outer peripheries of the bolt tightening holes 40 that are located on a side closer to the inside of the cover 80.

Each space 84 is formed by a recess 86 that recedes from the outside to the inside of the cover 80. When each space 84 is viewed from the outside of the cover 80 in a direction perpendicular to the wall 80a of the cover 80, each space 84 is provided so as to be open to the outside of the cover 80. The strength of a portion of the mount fastening portion 82 that is located on the outside of the cover 80 is reduced by forming the space 84 open to the outside of the cover 80 at the position where the space 84 overlaps the region S connecting the two bolt tightening holes 40 of the mount fastening portion 82. Specifically, in FIG. 15, the strength of a hatched portion located on the outside of the cover 80 with respect to a dashed line Lc connecting the centers of the bolt tightening holes 40 is reduced.

In the cover 80 constructed as described above, when the load F2 applied outside the cover 80 upon the collision of the vehicle is input to each bolt tightening hole 40 via the bolt (not illustrated) tightened into the bolt tightening hole 40, the crack generated in the cover 80 can be caused to propagate between each bolt tightening hole 40 and each space 84. That is, the crack can be caused to propagate along the boundary (dashed line Lc in FIG. 15) with the hatched portion of the mount fastening portion 82 of FIG. 15 (portion of the mount fastening portion 82 where the strength is reduced). Thus, the cover 80 is broken so that only the hatched portion of the mount fastening portion 82 is separated from the cover 80, thereby suppressing the generation of the breakage hole communicating the inside and the outside of the cover 80. The shape and size of each space 84 are adjusted so that the crack is generated along the portion of the mount fastening portion 82 where the strength is reduced when the load F2 is input to each bolt tightening hole 40.

As described above, according to this embodiment, the space 84 open to the outside of the cover 80 is formed in the region S connecting the bolt tightening holes 40 of the mount fastening portion 82 of the cover 80. Therefore, it is possible to reduce the strength of the portion of the mount fastening portion 82 that is located on the outside of the cover 80. When the load F2 applied outside the cover 80 upon the collision of the vehicle is input to each bolt tightening hole 40, the portion of the mount fastening portion 82 where the strength is reduced is broken by forming the space 84. Therefore, it is possible to suppress the generation of the breakage hole communicating the inside and the outside of the cover 80. Thus, effects similar to those of the embodiments described above can be attained because it is unlikely that the motor 26 housed in the cover 80 is exposed from the cover 80.

Although the embodiments of the present disclosure are described above in detail with reference to the drawings, the present disclosure is also applicable to other embodiments.

For example, in the embodiments described above, the power transmission apparatus 14 is the hybrid power transmission apparatus, but is not limited to the hybrid power transmission apparatus, and may be a power transmission apparatus applied to an electric vehicle. That is, the present disclosure is applicable to a structure in which a motor is provided inside the power transmission apparatus.

In the embodiments described above, the depth J of the auxiliary hole 42 is set to the same dimension as the length K of the threaded portion of the bolt tightening hole 40, but need not essentially be set to the same dimension. That is, the depth of the auxiliary hole may be changed within a range in which the crack is generated toward the outside of the cover 25 upon the collision of the vehicle.

In the embodiments described above, the auxiliary holes 42 are provided by casting, but need not essentially be provided by casting. For example, the auxiliary holes 42 may be provided by cutting work after the casting of the cover 25.

In the embodiments described above, the three bolt tightening holes 40 are provided in the mount fastening portion 36, but the number of bolt tightening holes 40 may be changed. In reference to this, the number of auxiliary holes 42 may be changed depending on the number of bolt tightening holes 40.

In the embodiments described above, the line L1 passing through the center of the auxiliary hole 42 is parallel to the line L2 passing through the center of the bolt tightening hole 40, but the lines L1 and L2 need not essentially be parallel to each other completely. That is, the line L1 passing through the center of the auxiliary hole 42 may be inclined with respect to the line L2 passing through the center of the bolt tightening hole 40. In other words, modifications may be made within a range in which the auxiliary hole 42 is formed in the same direction as the axial direction of the bolt tightening hole 40.

The embodiments described above are merely examples, and various modifications and improvements may be made in the present disclosure based on the knowledge of those skilled in the art.

What is claimed is:

1. A power transmission apparatus, the power transmission apparatus configured for use in a vehicle and configured to be mounted on a vehicle member via a mount, the power transmission apparatus comprising:
   a case; and
   a motor inside the case; wherein
   the case includes a mount fastening portion for fastening the mount with a plurality of bolts;
   the mount fastening portion has a plurality of bolt tightening holes, the plurality of bolt tightening holes being configured so that the plurality of bolts are tightened into the plurality of bolt tightening holes, the bolt tightening holes having axial directions parallel to each other;
   an auxiliary hole with an axial direction in common with the axial directions of the plurality of bolt tightening holes is in a region connecting two adjacent bolt tightening holes when the mount fastening portion is viewed in the axial directions of the plurality of bolt tightening holes; and
   the auxiliary hole overlaps the region connecting the two adjacent bolt tightening holes when the mount fastening portion is viewed in the axial directions of the plurality of bolt tightening holes.

2. The power transmission apparatus according to claim 1, wherein a depth of the auxiliary hole is the same dimension as a length of a threaded portion of each of the bolt tightening holes.

3. The power transmission apparatus according to claim 1, wherein the auxiliary hole is cast.

4. The power transmission apparatus according to claim 1, wherein the auxiliary hole is at a middle position between the two adjacent bolt tightening holes.

5. The power transmission apparatus according to claim 1, wherein a center of the auxiliary hole is in the region connecting the two adjacent bolt tightening holes.

6. The power transmission apparatus according to claim 1, wherein the auxiliary hole in an area defined by two tangent lines connecting adjacent ones of the bolt tightening holes.

7. The power transmission apparatus according to claim 1, wherein the auxiliary hole is a blind hole.

8. The power transmission apparatus according to claim 1, wherein the auxiliary hole is configured to act as a stress concentrator.

9. The power transmission apparatus according to claim 1, wherein the auxiliary hole is configured to act as a stress concentrator that propagates a crack along a direction connecting adjacent ones of the bolt tightening holes.

10. A power transmission apparatus, the power transmission apparatus configured for use in a vehicle and configured to be mounted on a vehicle member via a mount, the power transmission apparatus comprising:
    a case; and
    a motor inside the case; wherein
    the case includes a mount fastening portion for fastening the mount with a plurality of bolts;
    the mount fastening portion has a plurality of bolt tightening holes, the plurality of bolt tightening holes being configured so that the plurality of bolts are tightened into the plurality of bolt tightening holes, the bolt tightening holes having axial directions parallel to each other;
    a recess that is recessed from outside of the case toward inside the case in a region connecting two adjacent bolt tightening holes when the mount fastening portion is viewed in the axial directions of the plurality of bolt tightening holes;
    when the mount fastening portion is viewed in the axial directions of the plurality of bolt tightening holes, a space is formed by the recess such that the recess overlaps the region connecting the two adjacent bolt tightening holes; and the space is open to the outside of the case when the space is viewed from the outside of the case in a direction perpendicular to a wall of the case.

11. The power transmission apparatus according to claim 10, wherein the recess is in the case.

\* \* \* \* \*